US012607813B2

(12) United States Patent
Xu et al.

(10) Patent No.: US 12,607,813 B2
(45) Date of Patent: Apr. 21, 2026

(54) LIGHT SOURCE MODULE AND OPTICAL COMMUNICATION DEVICE

(71) Applicant: Huawei Technologies Co., Ltd., Shenzhen (CN)

(72) Inventors: Benbo Xu, Shenzhen (CN); Xinbai Li, Beijing (CN); Guangcan Mi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 18/170,931

(22) Filed: Feb. 17, 2023

(65) Prior Publication Data

US 2023/0204881 A1 Jun. 29, 2023

Related U.S. Application Data

(63) Continuation of application No. PCT/CN2021/112666, filed on Aug. 16, 2021.

(30) Foreign Application Priority Data

Aug. 20, 2020 (CN) .......................... 202010845528.4

(51) Int. Cl.
*G02B 6/293* (2006.01)
*G02B 6/42* (2006.01)
(Continued)

(52) U.S. Cl.
CPC ......... *G02B 6/4257* (2013.01); *G02B 6/2938* (2013.01); *G02B 6/421* (2013.01);
(Continued)

(58) Field of Classification Search
CPC .... G02B 6/2938; G02B 6/421; G02B 6/4246; G02B 6/4257; G02B 6/4261;
(Continued)

(56) References Cited

U.S. PATENT DOCUMENTS 7,636,506 B2 * 12/2009 Fricker ............... G02B 6/4453
385/134
8,606,112 B2 * 12/2013 Tosetti ................... H04B 10/40
398/115

(Continued)

FOREIGN PATENT DOCUMENTS

CN 203788292 U 8/2014
CN 111142196 A 5/2020

*Primary Examiner* — Ryan A Lepisto
(74) *Attorney, Agent, or Firm* — Slater Matsil, LLP

(57) ABSTRACT

This application relates to a light source module applied to an optical communication device. The light source module includes a substrate, a light source, an electrical interface, a first optical interface, and a second optical interface. A connection between the light source module and the optical communication device is a detachable connection, and the light source and the electrical interface are disposed on the substrate. The electrical interface is configured to supply power to the light source, and the first optical interface is configured to output continuous light emitted by the light source and/or receive a first optical signal from the optical communication device. The second optical interface and the first optical interface are on different sides, and the second optical interface is configured to receive a second optical signal from an outside of the optical communication device and/or the first optical signal sent by the first optical interface.

20 Claims, 7 Drawing Sheets

Light source 402
Optical fiber 406
Optical interface 404
Electrical interface 403
Optical interface 405
Substrate 401
Passive device 501

(51) Int. Cl.

| | | |
|---|---|---|
| *H04B 10/40* | (2013.01) | |
| *H04B 10/50* | (2013.01) | |
| *H04B 10/80* | (2013.01) | |
| *H04J 14/02* | (2006.01) | |

(52) U.S. Cl.
CPC ......... *G02B 6/4246* (2013.01); *G02B 6/4261* (2013.01); *G02B 6/4274* (2013.01); *G02B 6/4284* (2013.01); *G02B 6/4292* (2013.01); *H04B 10/40* (2013.01); *H04B 10/505* (2013.01); *H04B 10/801* (2013.01); *H04J 14/0307* (2023.08); *H04B 10/506* (2013.01)

(58) Field of Classification Search
CPC .. G02B 6/4274; G02B 6/4284; G02B 6/4292; H04B 10/40; H04B 10/505; H04B 10/506; H04B 10/801; H04J 14/0307
See application file for complete search history.

(56) References Cited

U.S. PATENT DOCUMENTS

| | | | | |
|---|---|---|---|---|
| 9,614,620 | B2 * | 4/2017 | Ho ......................... | H04B 10/40 |
| 10,725,245 | B2 * | 7/2020 | Leigh ..................... | G02B 6/381 |
| 2013/0272643 | A1 * | 10/2013 | Traverso .............. | G02B 6/4284 |
| | | | | 385/2 |
| 2015/0104177 | A1 * | 4/2015 | Kato ...................... | H04B 10/40 |
| | | | | 398/79 |
| 2015/0180578 | A1 * | 6/2015 | Leigh ................... | G02B 6/4293 |
| | | | | 398/135 |

* cited by examiner

100

Subrack
101

Electrical
connector
103

Board
102

Panel
205

Optical I/O
interface 206

Board 204

Optoelectronic
connector 202

Optical processing
chip 203

Light source
module 201

Direction of
plugging

Direction of
unplugging

200

Electrical interface 403

Optical interface 404

Optical fiber 406

Light source 402

Passive device 501

Substrate 401

Optical interface 405

LIGHT SOURCE MODULE AND OPTICAL COMMUNICATION DEVICE

CROSS-REFERENCE TO RELATED APPLICATIONS

This application is a continuation of International Application No. PCT/CN2021/112666, filed on Aug. 16, 2021, which claims priority to Chinese Patent Application No. 202010845528.4, filed on Aug. 20, 2020. The disclosures of the aforementioned applications are hereby incorporated by reference in their entireties.

TECHNICAL FIELD

This application relates to the field of optical communication, and in particular, to a light source module and an optical communication device.

BACKGROUND

An optical network device includes key components such as an optical transmitter, an optical receiver, a wavelength division multiplexer, and a demultiplexer. The optical transmitter and the optical receiver are usually packaged into one module, which is referred to as an optical module. A silicon optical technology is advantageous in high integration, and has advantages of low power consumption and low package costs especially in implementation of a multi-channel optoelectronic component. Therefore, the silicon optical technology is considered to be one of important trends in development of a next-generation optoelectronic component.

Currently, a main cause for failure of an optical module is that an optical source in the optical module fails. Therefore, the optical network device uses a pluggable light source module. When a light source fails, only the failed light source needs to be replaced, without replacing another component (for example, an optical modulator) in the optical module. In this solution in which the optical network device uses a pluggable light source module, not only the pluggable light source module but also an input/output (I/O) interface needs to be disposed on a panel of the optical network device. In this case, available space on the panel of the optical network device is limited, and it is often impossible to ensure enough space for disposing a heat dissipation hole. As a result, performance of a device board is limited.

SUMMARY

In view of this, an embodiment of this application provides a light source module and an optical communication device, which can greatly save available space on a panel.

A first aspect of this application discloses a light source module applied to an optical communication device, where the light source module includes a substrate, a light source, an electrical interface, a first optical interface, and a second optical interface. A connection between the light source module and the optical communication device is a detachable connection. The light source and the electrical interface are disposed on the substrate. The electrical interface is configured to supply power to the light source. The first optical interface is configured to output continuous light emitted by the light source and/or receive a first optical signal from the optical communication device. The second optical interface and the first optical interface are on different sides, and the second optical interface is configured to receive a second optical signal from an outside of the optical communication device and/or the first optical signal sent by the first optical interface.

The light source module provided in this application is equipped with an optical input/output port. Therefore, an optical input/output port does not need to be independently disposed on a panel of the optical network device that cooperates with the light source module for use. In this way, available space of the panel is greatly saved. A heat dissipation hole and the like may be disposed in the saved space of the panel to improve performance of a device board.

In an implementation, the first optical interface includes a plurality of first channels. Some first channels in the plurality of first channels are configured to send the continuous light and/or receive the second optical signal that passes through the second optical interface, and the other first channels in the plurality of first channels are configured to receive the first optical signal.

In an implementation, the second optical interface includes a plurality of second channels. Some second channels in the plurality of second channels are configured to receive the first optical signal sent by the first optical interface, and the other second channels in the plurality of second channels are configured to receive the second optical signal.

In an implementation, the first optical interface includes a plurality of groups of interfaces, where a first group of interfaces is configured to send the continuous light, a second group of interfaces is configured to receive the second optical signal that passes through the second optical interface, and a third group of interfaces is configured to receive the first optical signal.

In an implementation, the second optical interface includes a plurality of groups of interfaces, where one group of interfaces is configured to receive the first optical signal sent by the first optical interface, and another group of interfaces is configured to receive the second optical signal.

The plurality of channels and the plurality of groups of interfaces of the optical interface listed above are design examples. The optical interface may be obtained by integrating the plurality of groups of interfaces, or by separately and independently disposing the plurality of groups of interfaces.

The light source module may further include an optical amplifier, where the optical amplifier is located between the first optical interface and the second optical interface, and is configured to amplify an optical signal transmitted between the first optical interface and the second optical interface.

The light source module further includes an optical wavelength multiplexer/demultiplexer. The optical wavelength multiplexer/demultiplexer is located between the first optical interface and the second optical interface, and is configured to multiplex or demultiplex the optical signal transmitted between the first optical interface and the second optical interface.

When the optical interface includes an optical fiber, the light source module further includes a fastening apparatus. The fastening apparatus is in direct contact with the optical interface, to limit a position of the optical interface.

A connection between the light source module and the optical communication device is a detachable connection, which includes but is not limited to manners such as plugging and unplugging, clipping, or fastening using a bolt and nut.

A second aspect of this application discloses an optical communication device, including any one of the light source modules in the first aspect, an optoelectronic connector, and an optical processing chip. The optoelectronic connector is
configured to connect the light source module and the
optical processing chip, and a connection between the opto-
electronic connector and the light source module is a detach-
able connection. The light source module is configured to
output continuous light to the optical processing chip. The
optical processing chip is configured to modulate an elec-
trical signal onto the continuous light sent by the light source
module, so as to obtain a first optical signal, and send the
first optical signal to the light source module. The light
source module is further configured to receive a second
optical signal from an outside of the optical communication
device. The optical processing chip is further configured to
demodulate, to obtain an electrical signal, the second optical
signal that is sent by the light source module and that is from
the outside of the optical communication device.

A third aspect of this application further discloses a light
source module applied to an optical communication device,
where the light source module includes a substrate, an
optical emitting module, an electrical interface, a first optical
interface, and a second optical interface. A connection
between the light source module and the optical communi-
cation device is a detachable connection. The optical emit-
ting module includes a light source and a first optical
modulator. The optical emitting module and the electrical
interface are disposed on the substrate. The electrical inter-
face is configured to supply power to the light source, and
the electrical interface is further configured to obtain a first
electrical signal and input the first electrical signal to the
optical emitting module. The light source in the optical
emitting module is configured to output first continuous light
to the first optical modulator in the optical emitting module,
and the first optical modulator is configured to modulate the
first electrical signal into a first optical signal. The second
optical interface is configured to output the first optical
signal to an outside of the optical communication device.
The first optical interface and the second optical interface
are on different sides. The light source in the optical emitting
module is further configured to output second continuous
light through the first optical interface. The first optical
interface is further configured to receive a second optical
signal from the optical communication device. The second
optical interface is further configured to output the second
optical signal to the outside of the optical communication
device.

According to the optical communication device disclosed
in this application, both the first optical signal and the
second optical signal are input and output through the
optical interfaces on the light source module, and no optical
I/O port needs to be disposed on a panel, thereby greatly
saving use space of the panel.

The second optical interface is further configured to
receive a third optical signal from the outside of the optical
communication device, and output the third optical signal to
the first optical interface.

In an implementation, the first optical interface includes a
plurality of first channels. Some first channels in the plural-
ity of first channels are configured to send the second
continuous light and/or receive the third optical signal that
passes through the second optical interface, and the other
first channels in the plurality of first channels are configured
to receive the second optical signal.

In an implementation, the second optical interface
includes a plurality of second channels. Some second chan-
nels in the plurality of second channels are configured to
receive the second optical signal that passes through the first
optical interface or the first optical signal, and the other second channels in the plurality of first channels are con-
figured to receive the third optical signal.

In an implementation, the first optical interface includes a
plurality of groups of interfaces, where a group of interfaces
is configured to send the continuous light, another group of
interfaces is configured to receive the third optical signal
that passes through the second optical interface, and still
another group of interfaces is configured to receive the
second optical signal.

In an implementation, the second optical interface
includes a plurality of groups of interfaces, where a group of
interfaces is configured to receive the first optical signal,
another group of interfaces is configured to receive the
second optical signal that passes through the first optical
interface, and still another group of interfaces is configured
to receive the third optical signal.

In an implementation, the electrical interface includes a
plurality of groups of interfaces, where a group of interfaces
is configured to supply power to the light source, and
another group of interfaces is configured to transmit the first
electrical signal.

Generally, a group of interfaces includes at least one
interface, and one interface includes at least one optical
transmission channel. The plurality of channels and the
plurality of groups of interfaces of the optical interface or the
electrical interface list above are design examples. The
optical interface or the electrical interface may be obtained
by integrating the plurality of groups of interfaces, or by
separately and independently disposing the plurality of
groups of interfaces.

The light source module may further include an optical
amplifier, where the optical amplifier is located between the
first optical interface and the second optical interface, and is
configured to amplify an optical signal transmitted between
the first optical interface and the second optical interface.

The light source module further includes an optical wave-
length multiplexer/demultiplexer. The optical wavelength
multiplexer/demultiplexer is located between the first opti-
cal interface and the second optical interface, and is con-
figured to multiplex or demultiplex the optical signal trans-
mitted between the first optical interface and the second
optical interface.

A connection between the light source module and the
panel of the optical communication device is a detachable
connection, which includes but is not limited to manners
such as plugging and unplugging, clipping, or fastening
using a bolt and nut.

A fourth aspect of this application further discloses an
optical communication device, including any one of the light
source modules in the third aspect, an optoelectronic con-
nector, and an optical processing chip. The optoelectronic
connector is configured to connect the light source module
and the optical processing chip. A connection between the
light source module and the optoelectronic connector is a
detachable connection. The optical processing chip includes
a processor and a second optical modulator. The processor is
configured to send a first electrical signal to an optical
emitting module through an electrical interface. The light
source module is configured to output second continuous
light to the optical processing chip. The second optical
modulator is configured to modulate, to obtain a second
optical signal, a second electrical signal onto the second
continuous light output by the light source module.

Optionally, a rate of the second electrical signal is differ-
ent from a rate of the first electrical signal. Preferably, the
rate of the second electrical signal is greater than the rate of
the first electrical signal.

The optical communication device may further include an electrical connector and an optical connector. A connection between the optical connector and the first optical interface is a detachable connection, and a connection between the electrical connector and the electrical interface is a detachable connection. The electrical connector and the optical connector may be integrated optoelectronic connectors.

The optical communication device disclosed in this application not only saves use space of a panel, but also directly modulates some low-rate services in the light source module and modulates a high-rate electrical signal in the optical processing chip, thereby improving communication efficiency of a communication system.

DETAILED DESCRIPTION OF ILLUSTRATIVE EMBODIMENTS

The technical solutions proposed in this application are applicable to different service scenarios, including but not limited to: an optical transmission network (OTN), an optical access network (OAN), short-distance optical interconnect, wireless service fronthaul/backhaul, and the like.

Figure 1:
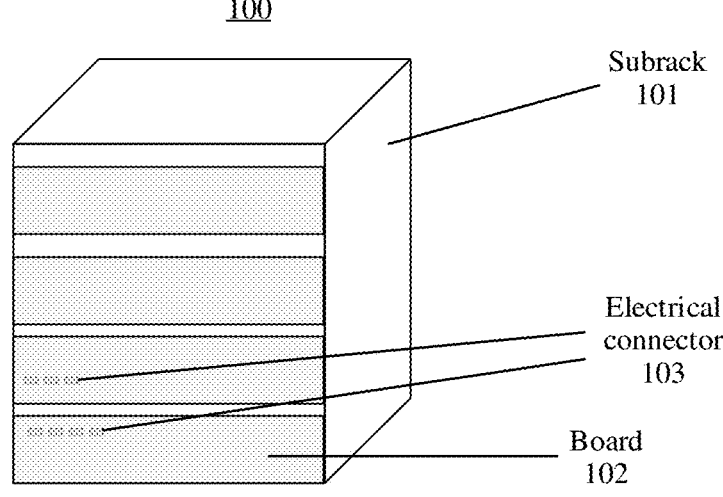
FIG. 1 is a schematic diagram of a structure of a possible optical communication device.

FIG. 1 is a schematic diagram of a structure of a possible optical communication device. As shown in FIG. 1, the device 100 includes a subrack 101 and a board 102. The subrack 101 has one or more slots for fastening the board 102. The board 102 has an electrical connector 103 configured to connect an electrical interface of an optical module. Usually, the optical communication device includes one or more types of boards, to complete functions such as processing, transmission, and exchanging of customer service data. The optical module is one of important components of the optical communication device, and is configured to include customer service data in an optical signal for sending and/or parse out customer service data from an optical signal. When the optical module has only a sending function, the optical module is generally referred to as a transmitter optical subassembly (TOSA). When the optical module can only receive and detect an optical signal, the optical module is generally referred to as a receiver optical subassembly (ROSA). An optical module that has both sending and receiving functions is referred to as a bi-directional optical sub-assembly (BOSA). Currently, one end of the optical module is an electrical interface, and is configured to be connected to an electrical interface on the board. An opposite end of the optical module is an optical interface, and is configured to be connected to an optical fiber, to implement a connection to another optical communication device in a network, or a connection between different boards of a same device. The electrical interface of the optical module is also commonly referred to as an edge connector. It should be noted that, unless otherwise specifically limited, one optical communication device may include one or more boards. A quantity of electrical interfaces on one board is set based on a specific requirement, which is not limited in this application. It should be further noted that, a person skilled in the art may learn that in the field of optical component technologies, a module has an independent package.

Figure 2:
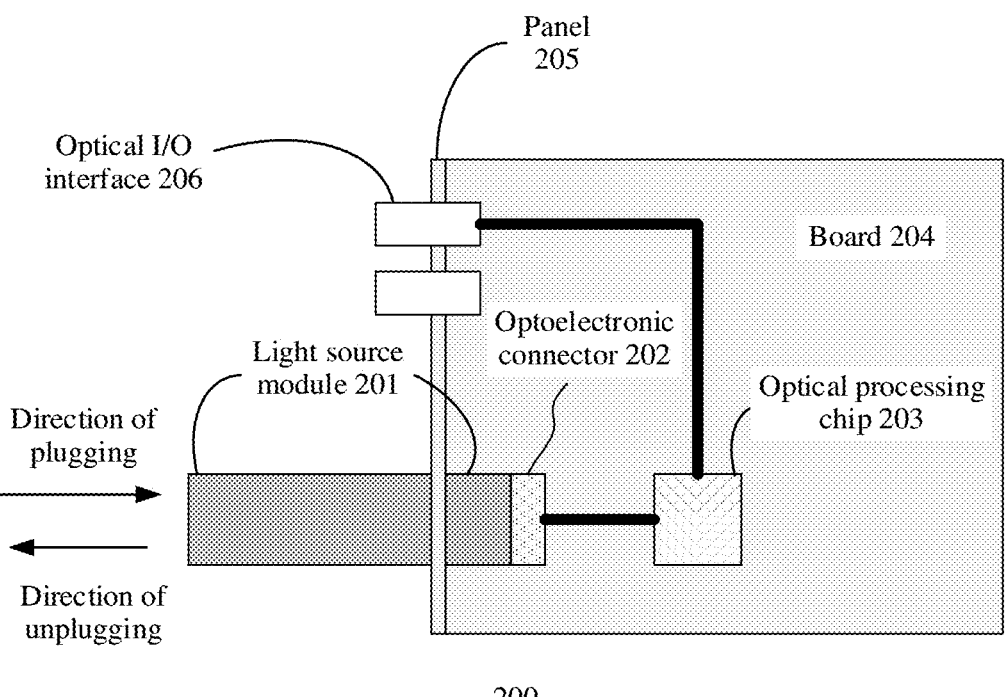
FIG. 2 is a schematic diagram of a structure of an optical communication device 200 including a light source module 201.

FIG. 2 is a schematic diagram of a structure of an optical communication device 200 including a light source module 201. This accompany drawing is a cutaway drawing. Specifically, the device may be the communication device shown in FIG. 1 or be similar to the communication device shown in FIG. 1 or a component of a part of the communication device. As shown in FIG. 2, the optical communication device 200 includes the light source module 201, an optoelectronic connector 202, an optical processing chip 203, a board 204, a panel 205, and at least one optical I/O interface 206. The light source module 201 implements a pluggable connection to the optoelectronic connector 202 through an opening on the panel 205. FIG. 2 shows directions of plugging and unplugging of the light source module 201. It should be noted that such plugging and unplugging perpendicular to the panel 205 are merely an example. In a specific design, plugging and unplugging with an inclined angle with the panel 205 may be further designed, so that plugging and unplugging operations are more convenient and easier. The optical processing chip 203 is connected to an optical interface in the optoelectronic connector 202, to obtain continuous light provided by the light source module 201. The optical processing chip 203 modulates a received electrical signal onto the continuous light to generate an optical signal, and the optical signal is output through the optical I/O interface 206. In a single-fiber bidirectional scenario, there may be only one optical I/O interface 206. In a dual-fiber bidirectional scenario, there may be at least two optical I/O interfaces 206, one of which is configured to output an optical signal to another device and the other is configured to receive an optical signal. The continuous light mentioned in this application refers to unmodulated light emitted by a light source, and an optical signal, signal light or modulated light refers to light generated by modulating an electrical signal onto the continuous light.

In the optical communication device in FIG. 2, the light source is packaged into one independent module as an object to be replaced upon failure. This reduces replacement costs of the optical module. In addition, ingenious design of a detachable connection of the light source module simplifies complexity of replacement upon failure. In addition, in the technical solution in FIG. 2, not only an interface of the light source module 201 but also at least one optical I/O interface 206 need to be disposed on the panel 205. Therefore, available space on the panel is limited. As a result, space for disposing a heat dissipation hole on the panel 205 is reduced, and heat dissipation performance of the optical communication device is limited.

Therefore, this application is to resolve a technical problem of how to increase available space of the panel of the optical communication device.

Figure 3:
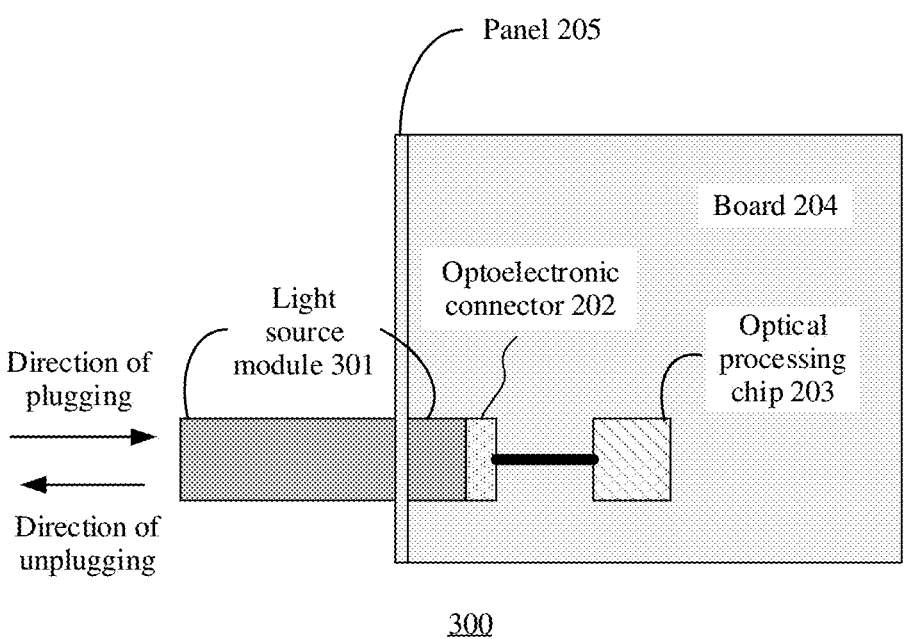
FIG. 3 is a schematic diagram of a structure of an optical communication device 300 including a light source module 301 according to an embodiment of this application.

FIG. 3 is a schematic diagram of a structure of an optical communication device 300 including a light source module 301 according to an embodiment of this application. As shown in FIG. 3, the optical communication device 300 includes the light source module 301, an optoelectronic connector 202, an optical processing chip 203, a board 204, and a panel 205. The light source module 301 implements a pluggable connection to the optoelectronic connector 202 also through an opening on the panel 205. A connection between the light source module 301 and the optical communication device 300 is a detachable connection. The optoelectronic connector 202 may be integrated with the light source module 301. The optical processing chip 203 is connected to an optical interface in the optoelectronic connector 202, to obtain continuous light provided by the light source module 301. The optical processing chip 203 modulates a received electrical signal onto the continuous light to generate an optical signal, and then the optical signal is output by using the light source module 301. An external optical signal is output to the optical processing chip 203 also by using the light source module 301.

In this way, no I/O interface needs to be independently disposed on the panel 205 for input and output of an optical signal, thereby greatly saving available space of the panel. A heat dissipation hole and the like may be disposed in the saved space of the panel to improve performance of the device board.

Optionally, a detachable connection of the light source module 301 may use a plugging and unplugging manner. FIG. 3 shows directions of plugging and unplugging of the light source module 301. Another detachable connection manner may also be used, for example, clipping or fastening using a bolt and nut.

Specifically, the optical processing chip 203 includes an optical modulator and a wavelength division multiplexer. Alternatively, the optical processing chip 203 includes an optical modulator, a wavelength division multiplexer, and an optical detector. Alternatively, the optical processing chip 203 includes an optical modulator, a wavelength division multiplexer, an optical detector, and a wavelength demultiplexer. The optical detector may be a photodiode (Photodiode, PD) or an avalanche photodiode (APD).

The optical processing chip mentioned in this application may be a silicon optical chip, or may be a chip of another material that may be used in the future.

Specifically, the optoelectronic connector 202 may be a discrete optical connector and a discrete electrical connector. The optical connector is configured to connect an optical interface of the light source module 301 and an optical interface of the optical processing chip 203, so that the light source module 301 provides continuous optical energy for the optical processing chip 203. The electrical connector is configured to connect an electrical interface of the light source module 301, to implement power supply to the light source module 301. Alternatively, the optoelectronic connector 202 may be an integrated component. The integrated optoelectronic connector can be formed at a time during processing, thereby reducing tolerances brought by assembling various limiting members. In addition, the integrated optoelectronic connector is advantageous in mechanical strength, thereby ensuring accuracy, repeatability, and stability in a plurality of times of plugging and unplugging. It should be noted that this application sets no limitation on relative positions and a quantity of optoelectronic connectors in the integrated optoelectronic connector. In a specific design, the integrated optoelectronic connector may be fabricated based on a design of an optoelectronic connection interface of the light source module.

Figure 4A:
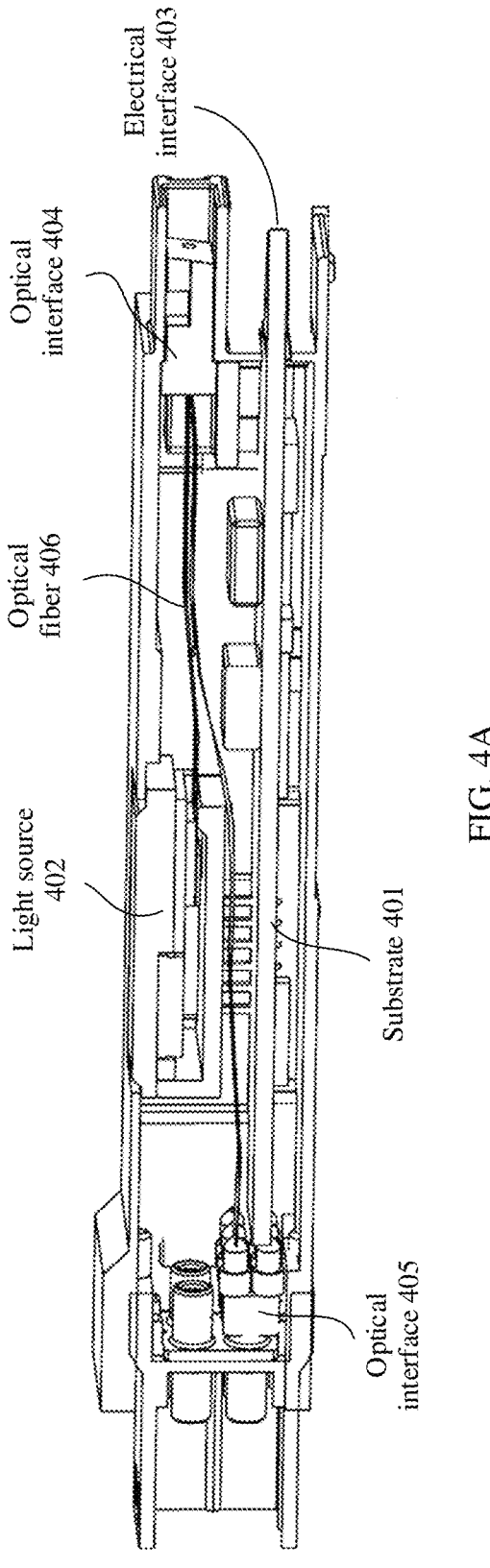
FIG. 4A is a schematic diagram of an internal structure of a light source module 301 according to an embodiment of this application.
Figure 4B:
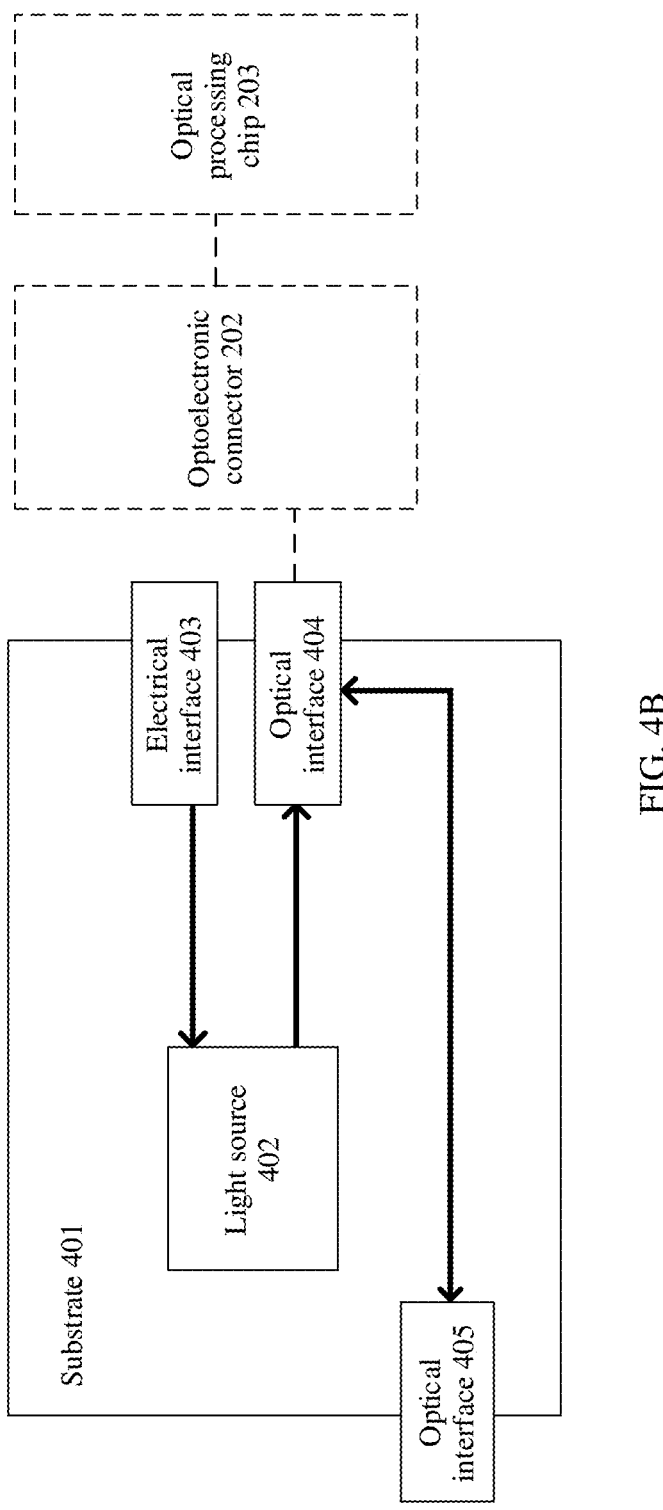
FIG. 4B is a schematic diagram of a logical structure of the light source module 301 corresponding to FIG. 4A according to an embodiment of this application.

FIG. 4A is a schematic diagram of an internal structure of a light source module 301 according to an embodiment of this application. As shown in FIG. 4A, the light source module 301 includes a substrate 401, a light source 402, an electrical interface 403, an optical interface 404, and an optical interface 405. FIG. 4B is a schematic diagram of a logical structure of the light source module 301 corresponding to FIG. 4A according to an embodiment of this application. The electrical interface 403, the optical interface 404, and the optical interface 405 are all disposed on the substrate 401, and the optical interface 404 and the optical interface 405 are on different sides. The electrical interface 403 obtains electric energy and provides the electric energy to the light source 402. The light source 402 emits continuous light and transmits the continuous light to the optical processing chip 203 through the optical interface 404. The optical processing chip 203 modulates the received continuous light to obtain modulated light. After the modulated light is transmitted to the light source module 301 through the optical interface 404, the modulated light is output through the optical interface 405. The optical interface 405 may further receive an external optical signal, and transmit the external optical signal to the optical processing chip 203 through the optical interface 404. The optical processing chip demodulates the external optical signal to obtain an electrical signal.

The optical interface 404 and the optical interface 405 are on different sides, and the optical interface 404 faces an inside of the communication device, and communicates with the optical processing chip 203. When the light source module 301 is a rectangle or similar to a rectangle, the optical interface 405 is usually and preferably on a side opposite to that of the optical interface 404, and is configured to receive an external optical signal or send an optical signal from the inside of the communication device. The optical interface 405 may alternatively be disposed on a side adjacent to that of the light source module 301. This is not limited in this application, provided that the optical interface 405 can communicate with an external optical fiber.

In an implementation, the optical interface 404 or the optical interface 405 may be a bidirectional optical interface, that is, some of channels in the optical interface are configured to send continuous light or signal light, and the other of the channels are configured to receive continuous light or signal light.

In another implementation, the optical interface 404 or the optical interface 405 each may further include two groups of interfaces, where a first group of interfaces is configured to send continuous light or signal light, and a second group of interfaces is configured to receive continuous light or signal light.

Alternatively, the optical interface 404 may include three groups of interfaces, where a first group of interfaces is configured to send continuous light to the optical processing chip 203, a second group of interfaces is configured to receive a modulated optical signal sent by the optical processing chip 203, and a third group of interfaces is configured to send, to the optical processing chip 203, an external modulated optical signal received by the optical interface 405.

Alternatively, the optical interface 405 may include two groups of interfaces, where one group of interfaces is configured to receive a modulated optical signal that passes through the optical interface 404 and that is from the optical processing chip 203, and the other group of interfaces is configured to receive an external optical signal.

A plurality of groups of interfaces may be integrated together, or may be separately and independently disposed. One group of interfaces may include at least one interface, and each interface may include at least one optical transmission channel.

Optionally, the optical interface 404 or the optical interface 405 may use an MT or LC optical fiber connector. When the optical interface includes an optical fiber, the light source module further includes a fastening apparatus. The fastening apparatus is in direct contact with the optical interface, to limit a position of the optical interface.

Figure 5A:
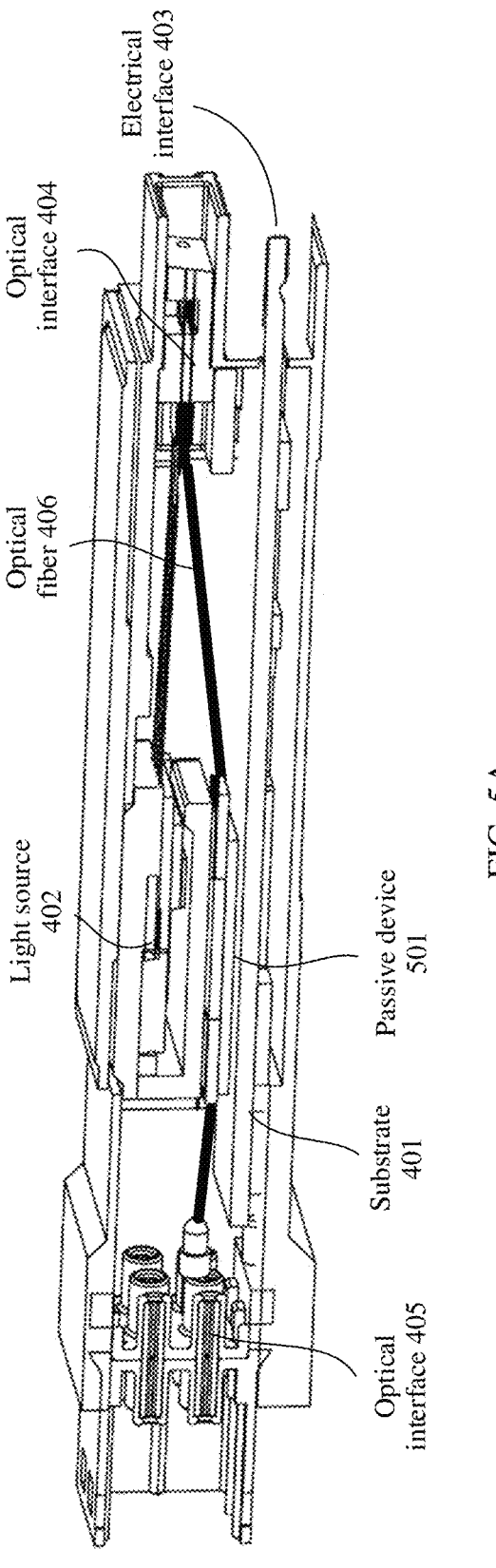
FIG. 5A is a schematic diagram of an internal structure of another light source module 301 according to an embodiment of this application.
Figure 5B:
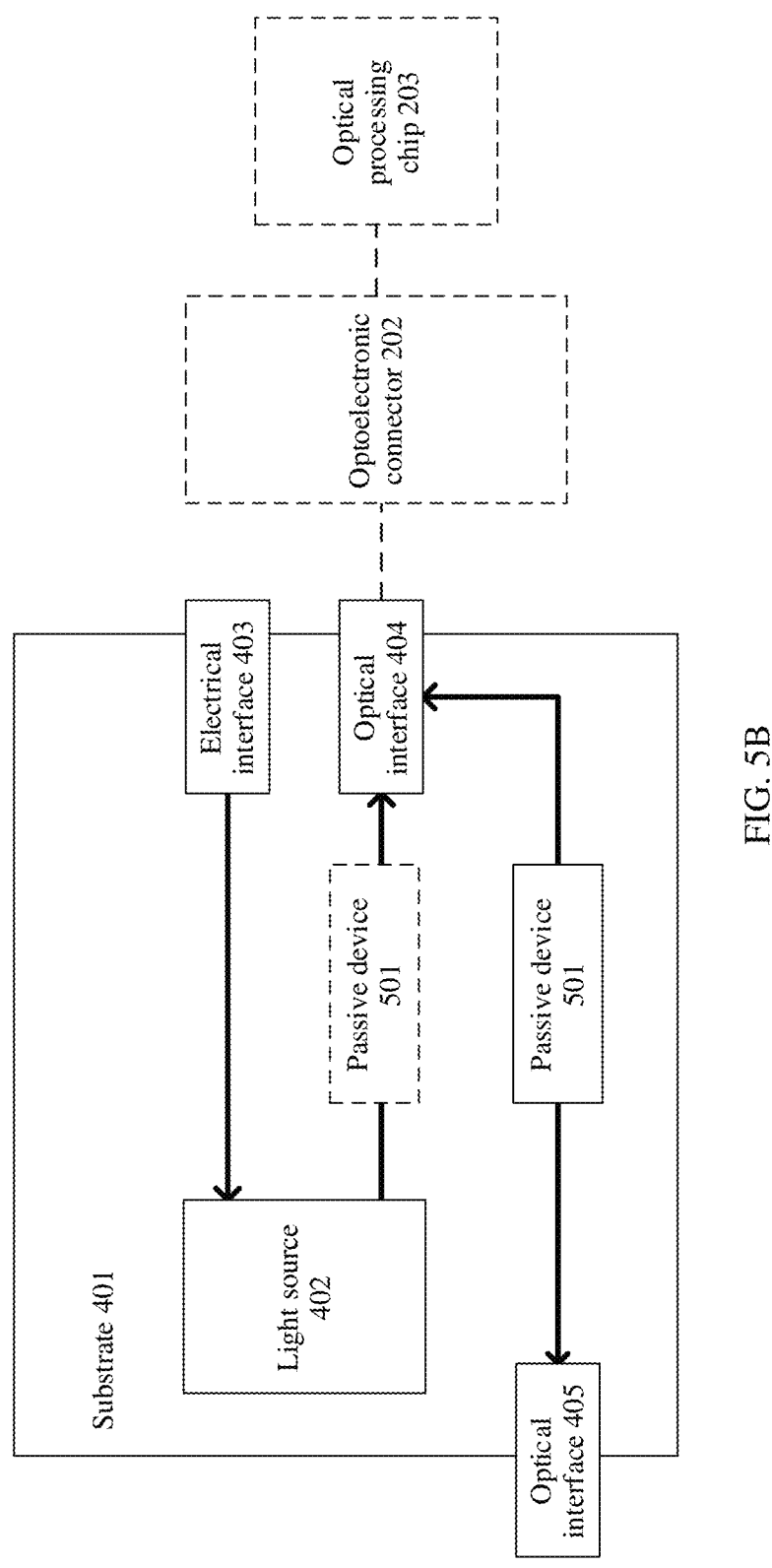
FIG. 5B is a schematic diagram of a logical structure of the light source module 301 corresponding to FIG. 5A according to an embodiment of this application.

FIG. 5A is a schematic diagram of an internal structure of another light source module 301 according to an embodiment of this application. As shown in FIG. 5A, the light source module 301 includes a substrate 401, a light source 402, an electrical interface 403, an optical interface 404, an optical interface 405, and a passive device 501. FIG. 5B is a schematic diagram of a logical structure of the light source module 301 corresponding to FIG. 5A according to an embodiment of this application. A difference between FIG. 5A and FIG. 4A lies in that the light source module 301 shown in FIG. 5A further includes the passive device 501. The passive device 501 is disposed between the optical interface 404 and the optical interface 405.

The passive device 501 may be a chip that implements a single-fiber bidirectional (BIDI) function, for example, an arrayed waveguide grating (AWG), a thin film filter (TFF), a Mach-Zehnder modulator (MZM), or a multimode interference (MMI) chip. The passive device 501 may further include another wavelength multiplexer/demultiplexer component, for example, a coupler, a power beam splitter, and a power beam combiner.

The passive device 501 may further include an optical amplifier, such as a semiconductor optical amplifier (SOA).

In addition, the foregoing passive device 501 may alternatively be disposed between the optical interface 404 and the light source 402.

It should be noted that there is physical contact between the light source 402 and the substrate 401, for example, an electrical connection, used to implement power supply and monitoring management of the light source. The substrate is a PCB, including a circuit, a small central processing unit, an inductive reactance element, and the like.

Specifically, the light source 402 may be a laser diode (LD), and continuous light output by the light source 402 is laser light. Alternatively, the light source 402 may be a light emitting diode (LED), and may output common continuous light.

In the embodiments of this application, the diagrams of the internal structures in FIG. 4A and FIG. 5A are merely design examples for the logic diagrams in FIG. 4B and FIG. 5B. Actually, there may be another design form, provided that functional designs of the logic diagrams in FIG. 4B and FIG. 5B can be implemented.

Figure 6:
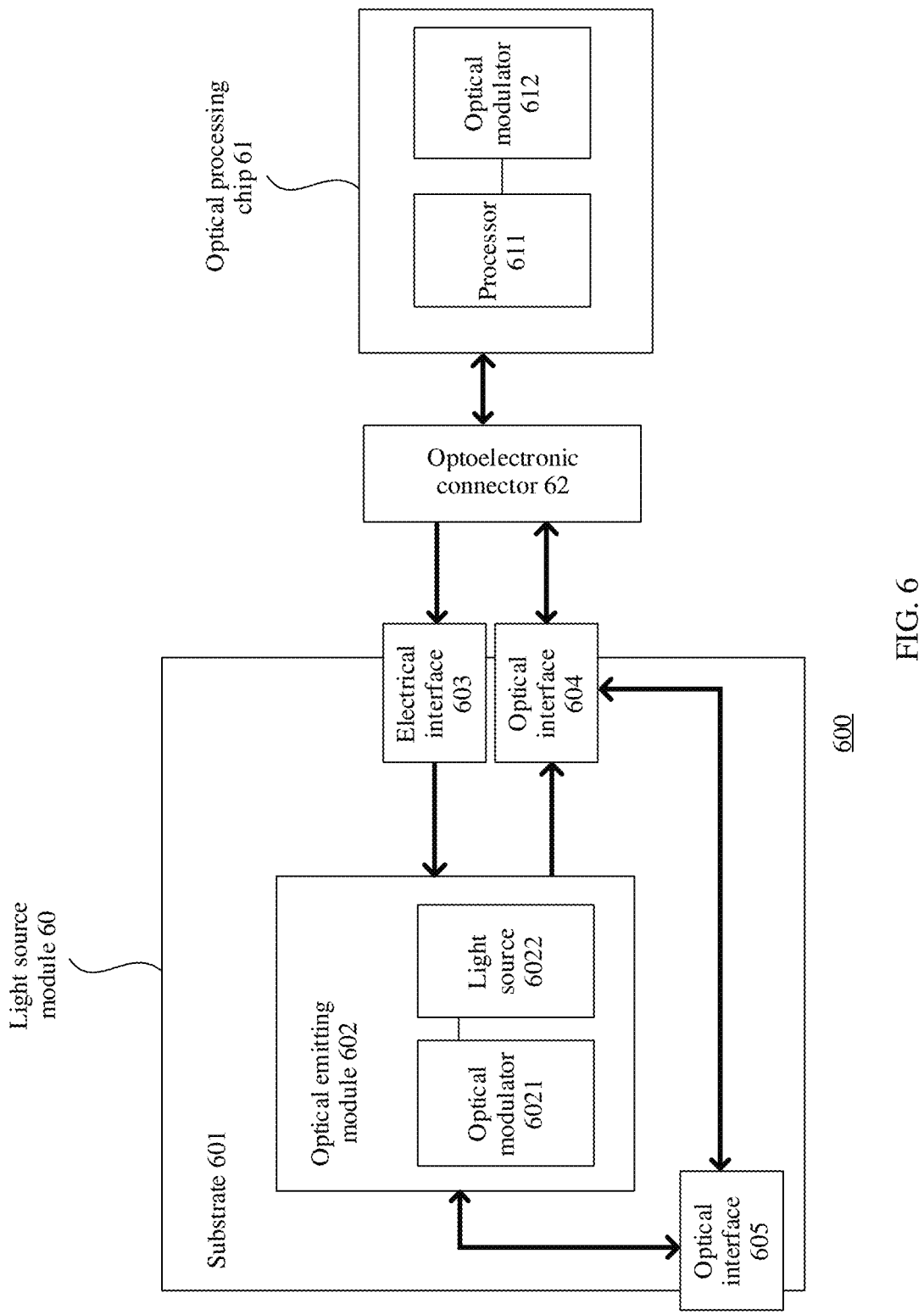
FIG. 6 is a schematic diagram of a structure of still another optical communication device 600 according to an embodiment of this application.

FIG. 6 is a schematic diagram of a logical structure of still another optical communication device 600 according to an embodiment of this application. As shown in FIG. 6, the optical communication device 600 includes a light source module 60, an optical processing chip 61, and an optoelectronic connector 62. The optoelectronic connector 62 is configured to connect the light source module 60 and the optical processing chip 61. A connection between the light source module 60 and the optoelectronic connector 62 is a detachable connection. The light source module 60 includes a substrate 601, an optical emitting module 602, an electrical interface 603, an optical interface 604, and an optical interface 605. The optical emitting module 602 includes an optical modulator 6021 and a light source 6022. The substrate 601, the optical emitting module 602, the electrical interface 603, the optical interface 604, and the optical interface 605 are all disposed on the substrate 601. The optical interface 604 and the optical interface 605 are on different sides. The optical processing chip 61 sends a first electrical signal to the optical emitting module 602 through the electrical interface 603. After the optical emitting module 602 receives the first electrical signal, the optical modulator 6021 modulates, to obtain first modulated light, the first electrical signal onto a first part of continuous light emitted by the light source 6022. The first modulated light is output through the optical interface 605. The light source 6022 further outputs a second part of continuous light to the optical processing chip 61 through the optical interface 604, and the optical processing chip 61 modulates a second electrical signal onto the second part of continuous light to obtain second modulated light. The second modulated light is output through the optical interface 604 and the optical interface 605.

An external optical signal may also be output to the optical processing chip 61 through the optical interface 605 and the optical interface 604 for demodulation. Alternatively, one part of an external optical signal may be output to the optical emitting module 602 through the optical interface 605 for demodulation, and the other part of the external optical signal may be output to the optical processing chip 61 for demodulation. Alternatively, the light source module 60 may further include an optical receiver. One part of an external optical signal may be output to the optical receiver through the optical interface 605 for demodulation, and the other part of the external optical signal may be output to the optical processing chip 61 for demodulation. Alternatively, an entire external optical signal may be output to the optical receiver through the optical interface 605 for demodulation to obtain an electrical signal, and then the electrical signal may be output to the optical processing chip 61.

A connection between the light source module 60 and the panel of the optical communication device 600 is a detachable connection, which includes but is not limited to manners such as plugging and unplugging, clipping, or fastening using a bolt and nut.

Preferably, rates of the first electrical signal and the second electrical signal are different, and the rate of the second electrical signal is greater than the rate of the first electrical signal. The optical processing chip 61 may output an electrical signal whose rate is less than a preset threshold to the electrical interface 603 through a specific channel.

It should be noted that the optical interface 604 and the optical interface 605 are on different sides, and the optical interface 604 faces an inside of the communication device, and communicates with the optical processing chip 61. When the light source module 60 is a rectangle or similar to a rectangle, the optical interface 605 is usually and preferably on a side opposite to that of the optical interface 604, and is configured to receive an external optical signal or send an optical signal from the inside of the communication device. The optical interface 605 may alternatively be disposed on a side adjacent to that of the light source module 60. This is not limited in this application, provided that the optical interface 605 can communicate with an external optical fiber.

In an implementation, the optical interface 604 or the optical interface 605 may be a bidirectional optical interface, that is, some of channels in the optical interface are configured to send continuous light or signal light, and the other of the channels are configured to receive continuous light or signal light.

In another implementation, the optical interface 604 or the optical interface 605 each may further include two groups of interfaces, where one group of interfaces is configured to send continuous light or signal light, and the other group of interfaces is configured to receive continuous light or signal light.

Alternatively, the optical interface 604 may include three groups of interfaces, where a first group of interfaces is configured to send continuous light to the optical processing chip 61, a second group of interfaces is configured to receive a modulated optical signal sent by the optical processing chip 61, and a third group of interfaces is configured to send, to the optical processing chip 61, an external modulated optical signal received by the optical interface 605.

Alternatively, the optical interface 605 may also include three groups of interfaces, where a first group of interfaces is configured to send first modulated light output by the optical emitting module 602, a second group of interfaces is configured to send second modulated light output by the optical interface 604, and a third group of interfaces is configured to receive an external optical signal.

A plurality of groups of interfaces may be integrated together, or may be separately and independently disposed. One group of interfaces may include at least one interface, and each interface may include at least one optical transmission channel.

In an implementation, the electrical interface 603 may also include two groups of interfaces, where one group of interfaces is configured to supply power to a light source, and the other group of interfaces is configured to transmit the first electrical signal to the optical emitting module 602.

Specifically, the optical processing chip 61 includes a processor 611 and an optical modulator 612. The processor 611 is configured to send the first electrical signal to the light source module 60, and send the second electrical signal to the optical modulator 612.

The optoelectronic connector 62 is configured to connect an optical interface and an electrical interface of the light source module 60. The optoelectronic connector may further include an electrical connector and an optical connector. A connection between the optical connector and the optical interface 604 is a detachable connection, and a connection between the electrical connector and the electrical interface 603 is a detachable connection. The electrical connector and the optical connector may be integrated optoelectronic connectors.

The optical communication device disclosed in this embodiment of this application directly modulates some low-rate services in the light source module and modulates a high-rate electrical signal in the optical processing chip, thereby improving communication efficiency of a communication system. However, for both a low-rate service and a high-rate service, input and output are performed through an optical interface on the light source module, and no optical I/O port needs to be disposed on the panel, thereby greatly saving use space of the panel.

It should be noted that, the terms such as "first" and "second" in this application are used to distinguish between similar objects, and are not necessarily used to describe specific sequence or order. The term "and/or" in this application, for example, "A and/or B" includes the following three cases: only A exists, only B exists, and both A and B exist.

It should be further noted that, unless otherwise specified, a specific description of some technical features in an embodiment may also be applied to explaining a corresponding technical feature mentioned in another embodiment. For example, design examples of an optical interface and an electrical interface in an embodiment are applicable to an optical interface and an electrical interface in all other embodiments. In addition, to reflect a relationship between components in different embodiments more clearly, a same reference numeral is used in this application to indicate components that have a same or similar function in different embodiments.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A light source module, comprising:
   a substrate;
   a laser;
   an electrical interface;
   a first optical interface; and
   a second optical interface; and
   wherein the light source module is configured to be detachably connected to an optical communication device via the first optical interface;
   wherein the laser and the electrical interface are disposed on the substrate, the electrical interface is configured to supply power to the laser, the laser is directly connected to the first optical interface by at least one first optical fiber, and the first optical interface is configured to output continuous light emitted by the laser to the optical communication device or to receive a first optical signal from the optical communication device; and
   wherein the second optical interface and the first optical interface are on different sides of the light source module, wherein a path between the first optical interface and the second optical interface includes at least one second optical fiber, the laser is disposed at least in part within a lateral extent of the at least one second optical fiber, an optical fiber of the at least one second optical fiber is directly connected to the second optical interface, and the second optical interface is configured to receive the first optical signal sent by the first optical interface through the at least one second optical fiber, or to receive a second optical signal from outside of the optical communication device.

2. The light source module according to claim 1, wherein the first optical interface comprises a plurality of first channels, some first channels in the plurality of first channels are configured to send the continuous light or receive the second optical signal that passes through the second optical interface, and the other first channels in the plurality of first channels are configured to receive the first optical signal.

3. The light source module according to claim 1, wherein the second optical interface comprises a plurality of second channels, some second channels in the plurality of second channels are configured to receive the first optical signal sent by the first optical interface, and the other second channels in the plurality of second channels are configured to receive the second optical signal.

4. The light source module according to claim 3, wherein the first optical interface comprises a plurality of groups of first interfaces, a first group of first interfaces in the plurality of groups of first interfaces is configured to send the continuous light, a second group of first interfaces in the plurality of groups of first interfaces is configured to receive the second optical signal that passes through the second optical interface, and a third group of first interfaces in the plurality of groups of first interfaces is configured to receive the first optical signal.

5. The light source module according to claim 3, wherein the second optical interface comprises a plurality of groups of second interfaces, a group of second interfaces in the plurality of groups of second interfaces is configured to receive the first optical signal sent by the first optical interface, and another group of second interfaces in the plurality of groups of second interfaces is configured to receive the second optical signal.

6. The light source module according to claim 3, wherein the light source module further comprises an optical amplifier, and the optical amplifier is configured to amplify an optical signal transmitted between the first optical interface and the second optical interface.

7. The light source module according to claim 3, wherein the light source module further comprises an optical wavelength multiplexer/demultiplexer, the optical wavelength multiplexer/demultiplexer is between the first optical interface and the second optical interface, and the optical wavelength multiplexer/demultiplexer is configured to multiplex or demultiplex the first optical signal transmitted between the first optical interface and the second optical interface.

8. The light source module according to claim 3, wherein the light source module further comprises a fastening apparatus, and the fastening apparatus is in direct contact with the first optical interface and is configured to limit a position of the first optical interface.

9. The light source module according to claim 1, wherein the first optical interface and the electrical interface are on the same side of the light source module.

10. The light source module according to claim 9, wherein the first optical interface is set above the electrical interface.

11. The light source module according to claim 1, wherein the substrate is a PCB.

12. The light source module according to claim 1, wherein the first optical interface and the second optical interface are MT interfaces.

13. The light source module according to claim 1, further comprising a passive device, wherein the passive device is disposed between the first optical interface and the second optical interface.

14. The light source module according to claim 1, wherein the laser has no incoming data signal.

15. An optical communication system, comprising:
an optical communication device; and
a light source module, wherein the light source module is configured to be detachably connected to the optical communication device via a first optical interface;
wherein the light source module comprises a substrate, a laser, an electrical interface, the first optical interface, and a second optical interface;
wherein the laser and the electrical interface are disposed on the substrate, the electrical interface is configured to supply power to the laser, the laser is directly connected to the first optical interface by at least one first optical fiber, and the first optical interface is configured to output continuous light emitted by the laser to the optical communication device or to receive a first optical signal from the optical communication device; and
wherein the second optical interface and the first optical interface are on different sides of the light source module, wherein a path between the first optical interface and the second optical interface includes at least one second optical fiber, the laser is disposed at least in part within a lateral extent of the at least one second optical fiber, an optical fiber of the at least one second optical fiber is directly connected to the second optical interface, and the second optical interface is configured to receive the first optical signal sent by the first optical interface through the at least one second optical fiber, or to receive a second optical signal from outside of the optical communication device.

16. The optical communication system according to claim 15, wherein the first optical interface comprises a plurality of first channels, some first channels in the plurality of first channels are configured to send the continuous light or receive the second optical signal that passes through the second optical interface, and the other first channels in the plurality of first channels are configured to receive the first optical signal.

17. The optical communication system according to claim 15, wherein the second optical interface comprises a plurality of second channels, some second channels in the plurality of second channels are configured to receive the first optical signal sent by the first optical interface, and the other second channels in the plurality of second channels are configured to receive the second optical signal.

18. The optical communication system according to claim 15, wherein the optical communication device comprises an optoelectronic connector, and the light source module is detachably connected to the optoelectronic connector.

19. The optical communication system according to claim 15, wherein the optical communication device comprises an optical processing chip, and wherein the light source module is configured to output continuous light to the optical processing chip.

20. The optical communication system according to claim 19, wherein the optical processing chip is configured to send the first optical signal to the light source module.

* * * * *